(12) United States Patent
Das et al.

(10) Patent No.: US 11,256,562 B2
(45) Date of Patent: Feb. 22, 2022

(54) AUGMENTED EXCEPTION PROGNOSIS AND MANAGEMENT IN REAL TIME SAFETY CRITICAL EMBEDDED APPLICATIONS

(71) Applicant: HONEYWELL INTERNATIONAL INC., Morris Plains, NJ (US)

(72) Inventors: Prasun Das, Karnataka (IN); Sreenivasan Govindillam K, Karnataka (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 166 days.

(21) Appl. No.: 16/365,884

(22) Filed: Mar. 27, 2019

(65) Prior Publication Data

US 2020/0310907 A1 Oct. 1, 2020

(51) Int. Cl.
*G06F 11/07* (2006.01)
*G06N 20/00* (2019.01)
(Continued)

(52) U.S. Cl.
CPC .......... *G06F 11/0796* (2013.01); *B64D 45/00* (2013.01); *G05B 23/0254* (2013.01);
(Continued)

(58) Field of Classification Search
CPC . B64D 45/00; G06F 11/0793; G06F 11/0796; G06F 17/18; G06F 11/004; G06F 11/0739; G06F 11/0703; G06F 11/0781; G06N 20/00; G08G 5/0021; G08G 5/0052; G05B 23/0254; G05B 2219/45071
See application file for complete search history.

(56) References Cited

U.S. PATENT DOCUMENTS 6,301,531 B1 * 10/2001 Pierro ................. B61L 27/0094
701/31.4
2015/0195192 A1 * 7/2015 Vasseur ............... G06F 11/2007
714/47.3
(Continued)

OTHER PUBLICATIONS

Schumann, Johann, et al., "Towards Software Health Management with Bayesian Networks," Future of Software Engineering Research, Nov. 7, 2010, pp. 331-336, XP058313132.

*Primary Examiner* — Bryce P Bonzo
*Assistant Examiner* — Michael Xu
(74) *Attorney, Agent, or Firm* — Lorenz & Kopf, LLP (57) ABSTRACT

A smart exception handler system for safety-critical real-time systems is provided. The system is configured to: receive a plurality of parameters at a plurality of nodal points in a real-time execution path; analyze the received parameters using a trained exception handling model, wherein the trained exception handling model has been trained using machine learning techniques to learn the critical path of execution and/or critical range of parameters at critical nodes, wherein the critical range of parameters comprises a learned threshold at a node; compute, using the trained exception handling model, a probability of fault at the critical nodes; compare the probability of fault at a critical node against a learned threshold at the node; and take proactive action in real-time to avoid the occurrence of a fault when the probability of fault at the node is higher than the learned threshold at the node.

18 Claims, 4 Drawing Sheets

(51) Int. Cl.
*B64D 45/00* (2006.01)
*G08G 5/00* (2006.01)
*G05B 23/02* (2006.01)
*G06F 17/18* (2006.01)

(52) U.S. Cl.
CPC ...... *G06F 11/0739* (2013.01); *G06F 11/0793* (2013.01); *G06N 20/00* (2019.01); *G08G 5/0021* (2013.01); *G06F 17/18* (2013.01)

(56) References Cited

U.S. PATENT DOCUMENTS

| | | | | |
|---|---|---|---|---|
| 2015/0333953 | A1* | 11/2015 | Vasseur | H04L 47/127 370/228 |
| 2018/0113773 | A1* | 4/2018 | Krishnan | G06F 11/008 |
| 2018/0225976 | A1* | 8/2018 | Rinehart | G08G 5/0013 |
| 2019/0095265 | A1* | 3/2019 | Dome | H04L 41/147 |
| 2020/0042369 | A1* | 2/2020 | Thankachan | G06F 11/3476 |
| 2020/0118024 | A1* | 4/2020 | Kajino | G06N 20/00 |
| 2020/0259746 | A1* | 8/2020 | Thubert | H04L 41/16 |

* cited by examiner

AUGMENTED EXCEPTION PROGNOSIS AND MANAGEMENT IN REAL TIME SAFETY CRITICAL EMBEDDED APPLICATIONS

TECHNICAL FIELD

The present invention generally relates to embedded application, and more particularly relates to systems and methods in embedded applications for real-time exception prediction and avoidance.

BACKGROUND

Various applications, such as avionics systems with control applications, are very rich in features with complex computation and timing requirements. Because of the complexity of the implementations and data dependencies over multiple interconnects, it is often difficult to foresee every execution path that may lead to erratic behaviors. During development and testing phases, avionics control application implementations are exposed to extreme scenarios to expose potential faults, but the dynamics and constraints on the avionics control applications when exposed to a real environment remain hard to analyze due to the large number of permutations and combinations that can lead to variances within the applications.

As an example, the flight management system (FMS) is a complex real-time airborne system in the cockpit of the airplane receiving, computing and transmitting data to and from multiple computing systems and sensor sources. It is difficult to find all critical issues via modelling and simulation during the design phase or testing phase. Therefore, exceptions can occur during operational use, and when exceptions do occur an exception handling recovery mechanism can be used to help the FMS recover from the exception. Exception handling may involve causing the FMS to execute a predefined escape route wherein the FMS brings itself down and attempts to recover to a previously defined older state. This can cause the FMS to be unavailable for a certain period of time.

Presently, recovery mechanisms are reactive. That is, after an error occurs and an application propagates to a branch of execution wherein the application cannot continue any further, the recovery mechanism kicks in to attempt to return the application to a reasonable operational state. The recovery mechanism may involve inhibiting usage of the application for a long period of time while recovery is attempted and potentially may not be successful in returning the application to a usable state. Recovery mechanisms may also not always be successful because a recovery can be initiated when the application is in an unstable state.

Hence, it is desirable to provide a non-reactive or proactive exception handling and recovery system that can prevent an application from not being usable for a long period of time. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A smart exception handler system for safety-critical real-time embedded systems is provided. The system is configured to: receive a plurality of parameters at a plurality of nodal points in a real-time execution path; analyze the received parameters using a trained exception handling model, wherein the trained exception handling model has been trained using machine learning techniques to learn the critical path of execution and/or critical range of parameters at critical nodes, wherein the critical range of parameters includes a learned threshold at a node; compute, using the trained exception handling model, a probability of fault at the critical nodes; compare the probability of fault at a critical node against a learned threshold at the node; and take proactive action in real-time to avoid the occurrence of a fault when the probability of fault at the node is higher than the learned threshold at the node.

A processor-implemented method for handling exceptions with safety-critical real-time systems in an aircraft is provided. The method includes: receiving a plurality of parameters at a plurality of nodal points in a real-time execution path for a safety-critical aircraft system; analyzing the received parameters using a trained exception handling model for the safety-critical aircraft system, wherein the trained exception handling model has been trained using machine learning techniques to learn the critical path of execution and/or critical range of parameters at critical nodes, wherein the critical range of parameters includes a learned threshold at a node; computing, using the trained exception handling model, a probability of fault at the critical nodes; comparing the probability of fault at a critical node against a learned threshold at the node; and taking proactive action in real-time to avoid the occurrence of a fault when the probability of fault at the node is higher than the learned threshold at the node.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for a smart exception handler system, for a highly complex, safety critical, real-time system, such as a flight management system (FMS). The disclosed apparatus, systems, techniques and articles describe a smart exception handler system that can learn the critical segments in the execution path of the real-time system and the critical range of parameters at nodal points (execution points) in the execution path that can lead to the occurrence of an exception. The disclosed apparatus, systems, techniques and articles describe a the smart exception handler system that can, based on the paths and the parameter states logged by the smart exception handler system over a series of execution in the active cycle, estimate using learned exception models when a real-time system is following a path leading to the occurrence of an exception. The disclosed apparatus, systems, techniques and articles describe a smart exception handler system can take proactive action prior to the occurrence of an exception to prevent the real-time system from experiencing an exception and avoid having to shut down and restart to reactively recover from an exception.

The disclosed apparatus, systems, techniques and articles describe a smart exception handler system wherein known exceptions or undesired states that are anticipated in a mission scenario can be accounted for at a design level by providing fault handling and recovery mechanisms for them. The disclosed apparatus, systems, techniques and articles describe a the smart exception handler system that can, for unknown exceptions and run-time faults, correct the state or the branch of execution of an erroneous path that is known to cause an exception.

Figure 1:
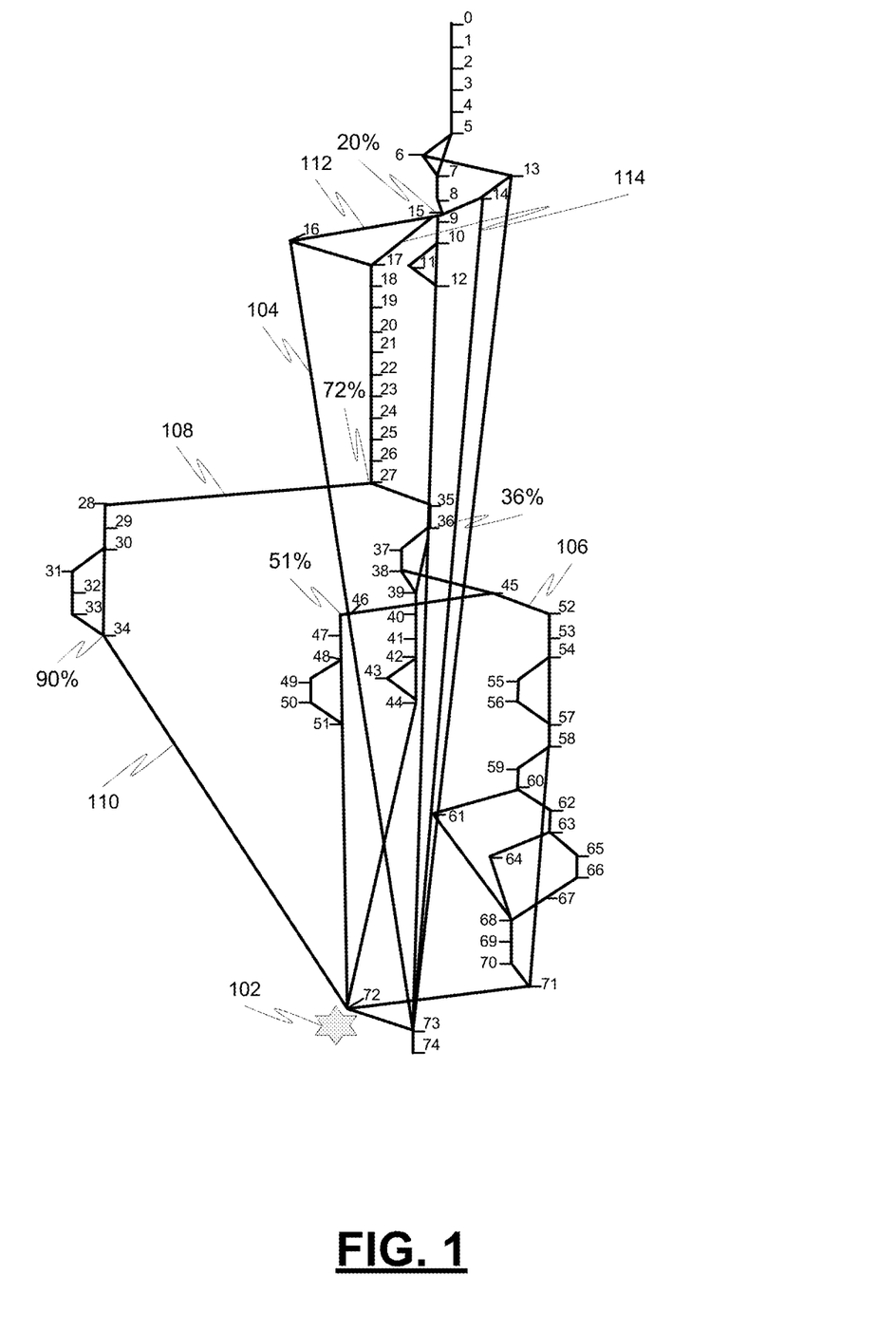
FIG. 1 is a diagram that provides an example graphical representation of multipronged execution paths in an example software application, in accordance with some embodiments.

FIG. 1 is a diagram that provides a graphical representation of multiple execution paths in example embedded software in an example avionics system. Depicted are a plurality of nodes which are labeled from 0, 1, 2 . . . 74. Software execution will lead to the system being at one of the nodes at different times during the execution cycle. In normal execution, node 0 represents the beginning state and node 74 represents the ending state. In abnormal execution, instead of ending at node 74, execution will end at the occurrence of an exception, which is represented by the star 102. There are many execution paths that can be taken to end at node 74 or at the star 102. At various nodes, parameters and pre-conditions decide the course of the next execution path. For example, an example standard execution path 104 includes nodes 0-6, 13, 14, 15, 16, 73, and 74. Another standard execution path 106 includes nodes 0-6, 13, 14, 15, 16, 17-27, 35-38, 45, 52-60, 62, 63, 65-71, 72, 73, and 74. A moderately critical execution path 108 and a highly critical execution path 110 have high probabilities of leading to the exception 102. The moderately critical execution path 108 includes nodes 27-34, and the highly critical execution path 110 includes nodes 34 and 72.

Different execution paths can branch out of some of the nodes (junctions). For example, at node 15 a branch 112 extends to node 16 and another branch 114 extends to node 17. The next node or branch that is taken is dependent on computed software parameters and environment parameters, such as altitude, velocity, temperature.

At critical nodes in this example, probabilities of a fault condition occurring have been determined based on historical computed parameters values and environmental parameter values at those critical nodes. For example at node 8, the probability of an exception occurring is depicted as 20 percent, at node 27 the probability of a fault is depicted as 72 percent, at node 36 the likelihood of a fault is depicted as 36 percent, at node 34 the likelihood of a fault is depicted as 90 percent, and at node 46 the likelihood of a fault is depicted as 51 percent. Whether or not an exception occurs depends on the path that is followed. A change in environment conditions and/or system variables later in an execution path, can result in a path with reduced probability of a fault to be picked up or a path with an increased probability of fault to be picked up.

A smart exception handler system can learn and store the historical footprints in the execution paths that may lead to an exception. The smart exception handler system can learn this information over a period (e.g., using regression based learning) and use the information, during runtime, to determine the probability of fault occurrence at nodes (e.g., critical junctions).

Figure 2:
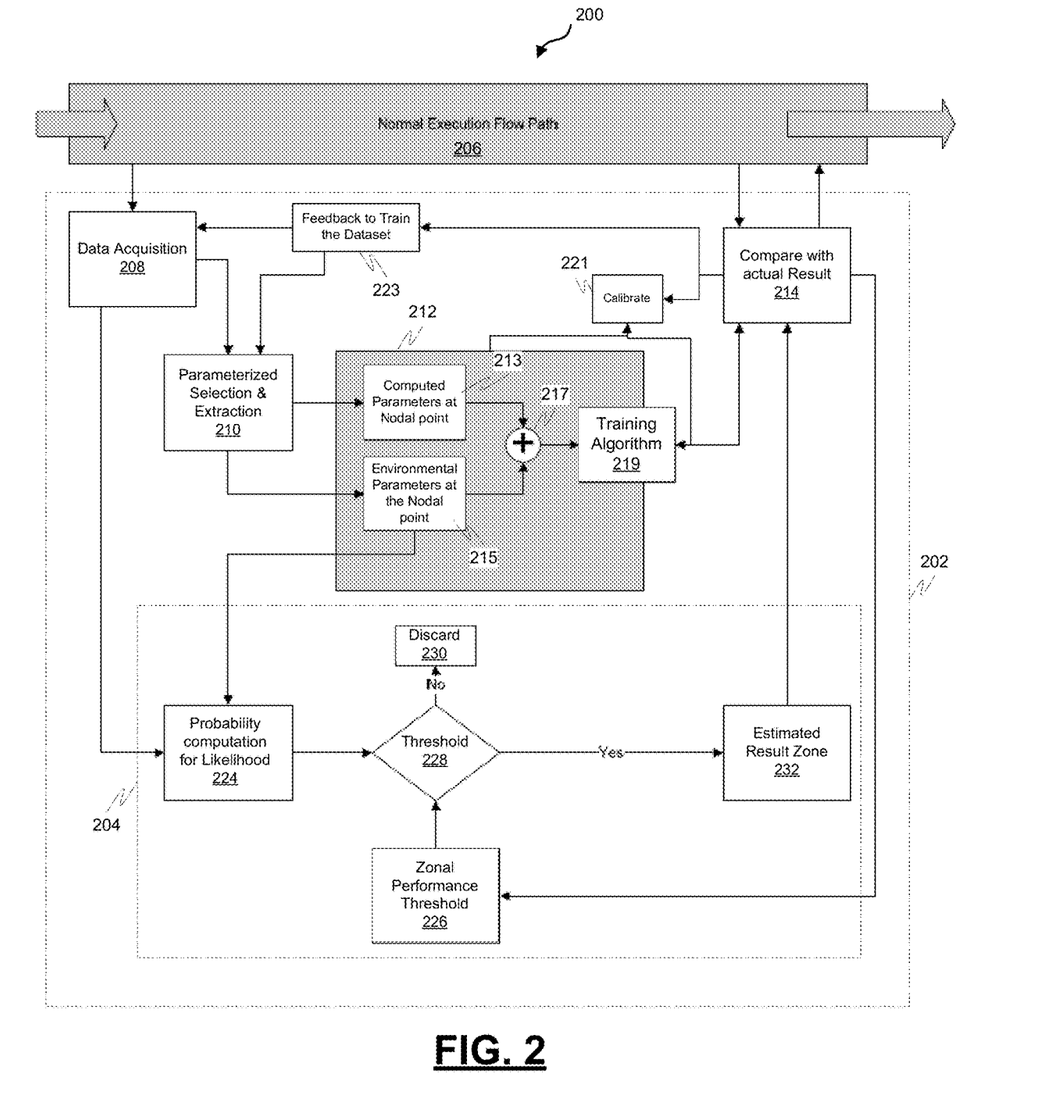
FIG. 2 is a block diagram of an example computing environment that includes an example system for training and operating an exception handling model that is configured to identify critical nodes in a software execution path, determine in real time the parameters at critical nodes in the software execution path whether the likelihood is high that the software is headed toward a fault state, and take proactive corrective action to prevent the occurrence of the fault state, in accordance with some embodiments.

FIG. 2 is a block diagram of an example computing environment 200 that includes an example smart exception handler system 202 for training and operating an exception handling model 204 that is configured to identify critical nodes in a software execution path 206, determine in real time at critical nodes in the software execution path 206 whether the likelihood is high that the software is headed toward a fault state, and take proactive corrective action to prevent the occurrence of the fault state. The example system 202 includes the exception handling model 204, a data acquisition module 208 for acquiring parameters from the normal execution flow path 206 at various nodes, a parameterized selection and extraction module 210 for selecting and extracting specific parameters at specific nodes in the execution path, a training module 212 for training the exception handling model 204, and a corrective action module 214.

The example system 202 includes a controller that is configured to implement the exception handling model 204, data acquisition module 208, parameterized selection and extraction module 210, training module 212, and corrective action module 214. The controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The data acquisition module 208 is configured to select parameters for each node in the normal execution flow path 206 over time and provide parameters to the exception handling model 204 and the parameterized selection and extraction module 210. The exception handling model 204 uses the provided parameters to determine if corrective action should be taken to prevent software execution from reaching a fault state. The parameterized selection and extraction module 210 is configured to select and extract certain parameters for each node, wherein the extracted parameters may vary from node to node, and provide the extracted parameters to the training module 212.

The training module 212 is configured to train the exception handling model 204, for example using regression-based learning, to recognize various execution paths, determine the probability of reaching a fault state in view of the current node and parameter values, and determine if corrective action should be taken to prevent software execution from reaching a fault state. The training module 212 is configured to acquire computed parameters 213 at the current nodal point and environmental parameters 215 at the current nodal point, sum (217) the parameters, and input the summed result to a training algorithm 219 that is configured to train the exception handling model 204, for example using regression-based learning. The environmental parameters are system parameters (e.g., ground or air speed), and computed parameters are parameters computed at that node during software execution. The computed 213 and environmental parameters 215 are fed to the training algorithm 219 that trains and matures the exception handling model 204. The training algorithm 219 also receives actual execution flow path data, for example from the corrective action module 214, to train the exception handling model 204 to predict the probability of later occurrence of faults based on computed parameters and environmental parameters at a current nodal point. Data used in the training module 212 may be calibrated (221) and feedback (223) may be provided to train the dataset.

The example exception handling model 204 is configured to identify critical nodes in the normal execution flow path. The critical nodes are nodes at which the execution path may branch to a path toward or away from a fault occurrence. At the critical nodes, the exception handling model 204 is configured to receive computed parameters and environmental parameters. The computed parameters and environmental parameters may be received from the data acquisition module and/or the parameterized selection and extraction module 210.

The example exception handling model 204 includes a probability calculation module 224 that is configured to predict the probability of a later fault occurrence in view of the parameter values at that nodal point. The example exception handling model 204 is further configured to compare the computed probability at the nodal point to a zonal performance threshold 226, for example via a comparison module 228. If it is determined that the computed probability is not greater than the zonal performance threshold, then the exception handling model 204 has no further action to take and can discard (230) its current computations. If it is determined that the computed probability is greater than the zonal performance threshold, then the exception handling model 204 can decide on a proactive action to take to avoid a fault, for example at an estimated result zone 232.

In this example, the proactive action can be in the form of one or more of forwarding a predicted outcome to the corrective action module 214, isolating the error prone path and/or state data, inducing a controlled exception to direct the outcome to a desired state or mode and/or revert back to the default value or state or initiate a cleanup of the transient resources (e.g., stack/heap or Process state or task control parameters or operating mode and sub-modes), isolating the error and activating a regeneration path, adopting an alternate execution in a slightly degraded mode until the system is fully operational, and announcing the problem in adequate form for visual consumption by the flight crew. As an example, upon certain data entry and pilot action under a particular combination of aircraft system parameters and internal computational state parameters, and with the system propagating towards an exception, the example exception handling model 204 will act proactively to learn to discard the operation all together, choose a degraded mode of operation to ensure that other critical computations and data output from the system is unaffected, and annunciate a message to the flight crew via a display system that announces that the system will operate in a degraded mode due to the inherent system problem that was anticipated to be encountered.

Figure 3A:
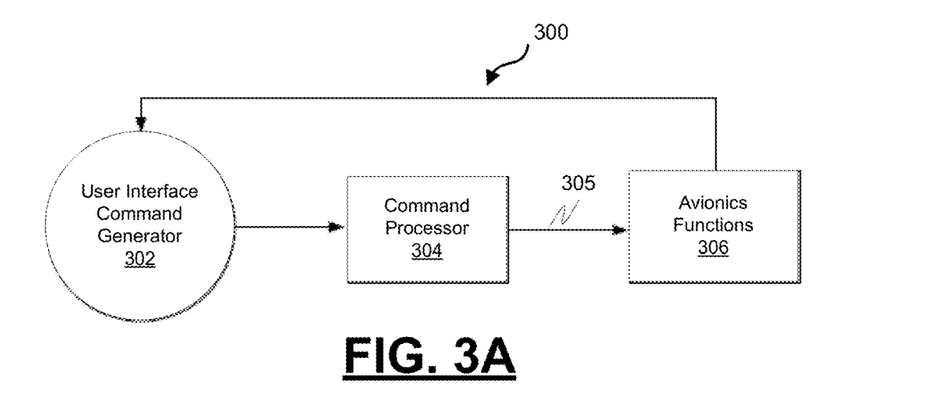
FIG. 3A is a block diagram depicting the functioning of an example of avionics system, in accordance with some embodiments.

FIG. 3A is a block diagram depicting the functioning of an example avionics system 300. The example system 300 includes a user interface command generator 302, a command processor 304, and an avionics function 306. In the example system 300, requests from an interactive navigation system have been sampled in a graphical command processor that supports a navigation function. The system 300 generates commands 305 via the command processor 304 based on user interaction via the user interface command generator 302. The commands 305 can enable an avionics function 306. Under certain non-nominal operations, multiple commands coupled with a transitional and dynamic state that can exist internally in the system 300 while switching over from one mode of operation to another, might push the system 300 to act upon intermediate or transitory state/data on complimentary functions that has not been well accounted for in the design, which can lead to a run-time software exception.

Under normal conditions, the commands 305 are processed at the command processor 304 based on an interface agreement between the interface command generator 302 and the command processor 304, and a command queue is built for handling the commands. An unchecked command processing and/or commands operating on intermediate and transitory data can corrupt the system leading to inconsistencies in avionics functions 306.

Figure 3B:
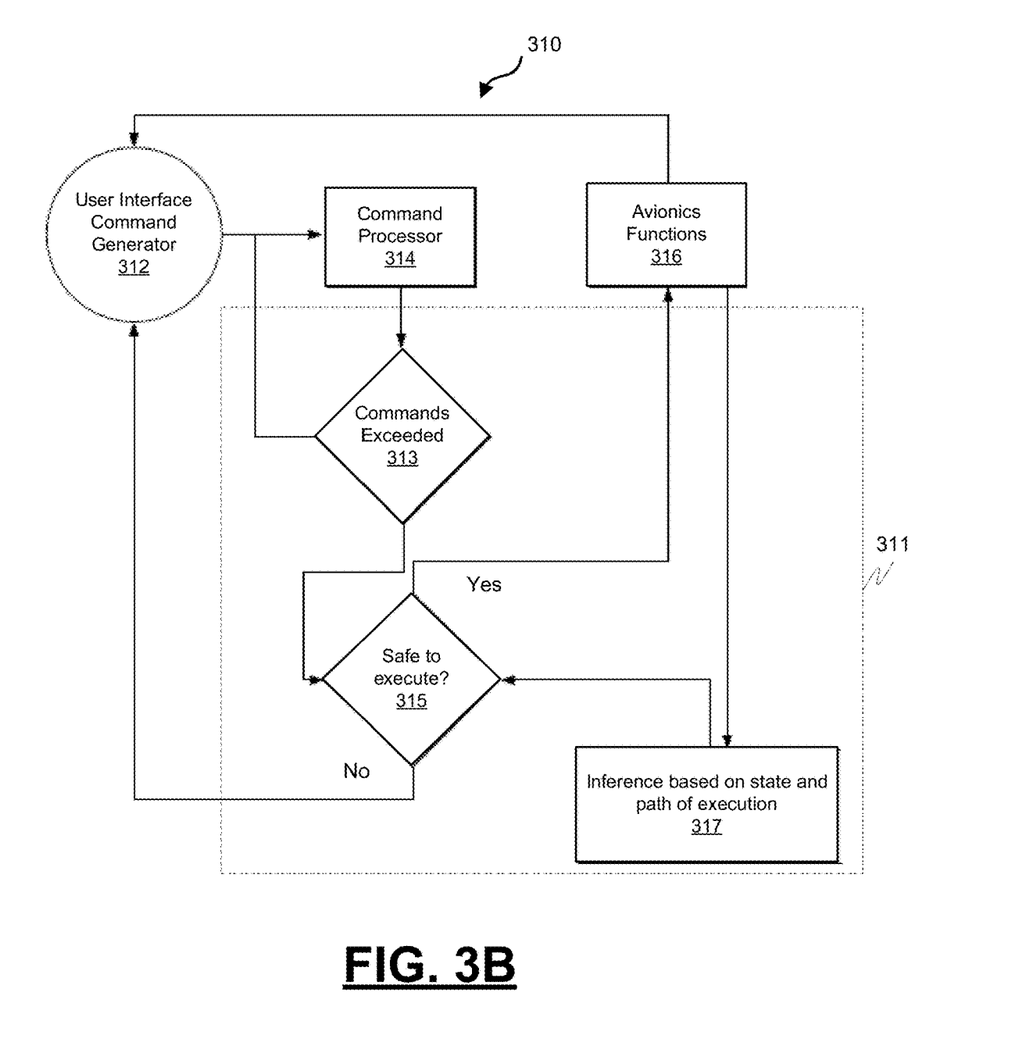
FIG. 3B is a block diagram depicting the functioning of an example avionics system 310 that has been modified to include a smart exception handling model, in accordance with some embodiments.

FIG. 3B is a block diagram depicting the functioning of an example avionics system 310 that has been modified to include an exception handling model 311. The example system 310 includes a user interface command generator 312, a command processor 314, an avionics function 316, and an exception handling model 311. The example exception handling model 311 is configured to check system states at predefined stages of the software execution path resulting from command processing, and eliminate commands that would potentially corrupt the system 310 or foresee the downward path of software call chain that would potentially lead to an exception. The example exception handling model 311 is configured to check for the number of commands, the type of commands, pre-conditions of the system state and all critical parameters and variables and the extent of internal modifications that the system would possibly be subjected to and quite probably undergo with each command execution.

In this example, the exception handling model 311 is configured to determine if a command 315 from the command processor exceeds the number of commands that should be executed (decision 318). If the number of commands has been exceeded (yes at decision 318), then the current command is skipped. If the number of commands has not been exceeded (no at decision 318), then a determination is made regarding whether the command is safe to execute (decision 320). If the command is safe to execute (yes at decision 320), then the command is provided to the avionics function 316. If the command is not safe to execute (no at decision 320), then the command is discarded and the user interface command generator 312 may provide more input on the generation of the next command. To determine if the command is safe to execute, the example exception handling model 311 is configured to acquire an inference based on the state and path of execution (operation 322). This may involve considering the type of commands, pre-conditions of the system state and all critical parameters and variables and the extent of internal modifications that the system would possibly be subjected to and quite probably undergo with each command execution.

The example exception handling model 311 is configured to learn from newly occurring exceptions and the commands 315, pre-conditions of the system state and all critical parameters and variables and the extent of internal modifications that led to the exception to predict conditions that may lead to an exception.

Figure 4:
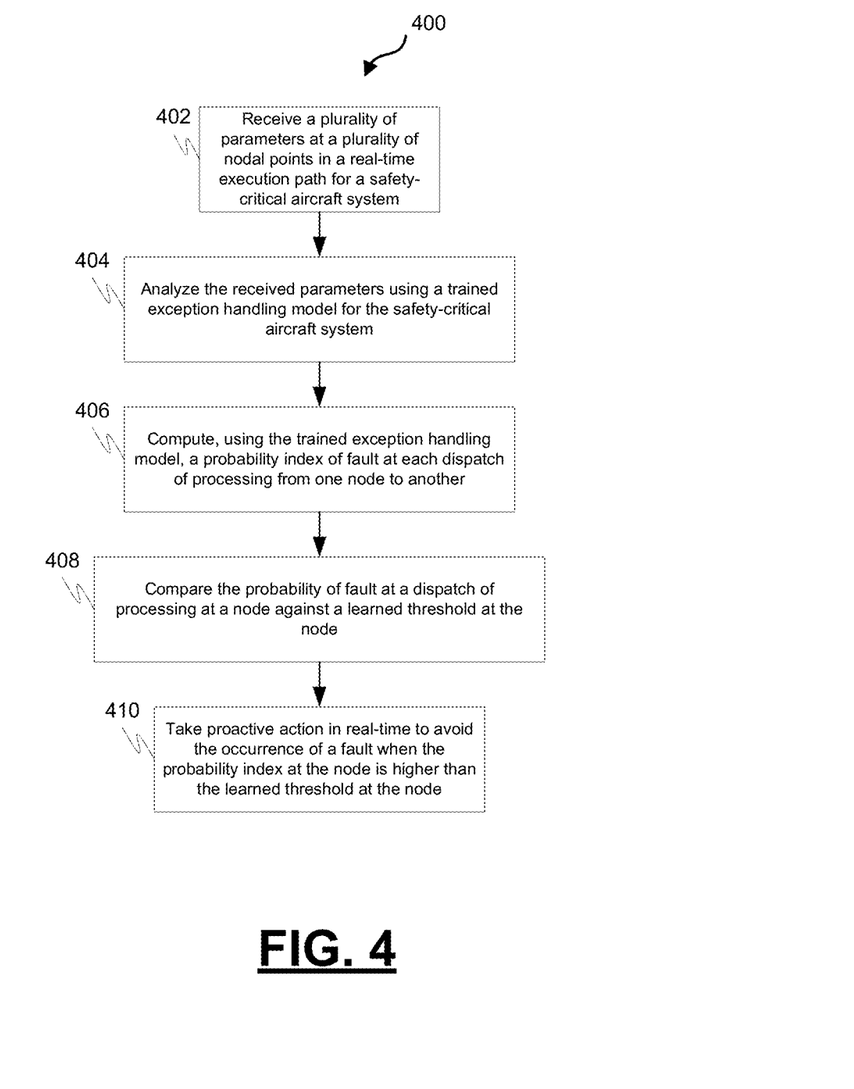
FIG. 4 is a process flow chart depicting an example process 400 for handling exceptions with safety-critical real-time systems, in accordance with some embodiments.

FIG. 4 is a process flow chart depicting an example process 400 for handling exceptions with safety-critical real-time systems in an aircraft. The order of operation within the process 400 is not limited to the sequential execution as illustrated in the figure, but may be performed in one or more varying orders as applicable and in accordance with the present disclosure.

The example process 400 includes receiving a plurality of parameters at a plurality of nodal points in a real-time execution path for a safety-critical aircraft system (operation 402). The parameters at a nodal point include computed parameters at the nodal point and environmental parameters at the nodal point.

The example process 400 includes analyzing the received parameters using a trained exception handling model for the safety-critical aircraft system (operation 404). The trained exception handling model has been trained using machine learning techniques to learn the critical path of execution and/or critical range of parameters at critical nodes, wherein the critical range of parameters comprises a learned threshold at a node.

The example process 400 includes computing, using the trained exception handling model, a probability of fault at the critical nodes (operation 406). The trained exception handling model may have been trained using regression-based learning. The example process 400 includes comparing the probability of fault at a critical node against a learned threshold at the node (operation 408).

The example process 400 includes taking proactive action in real-time to avoid the occurrence of a fault when the probability of fault at the node is higher than the learned threshold at the node (operation 410). Taking proactive action in real-time to avoid the occurrence of a fault may include visually annunciating to the flight crew that a safety-critical real-time system is likely to experience a fault if its critical path of execution is not altered, adopting an alternate execution in a slightly degraded mode until the safety-critical aircraft system is fully operational, and/or triggering an appropriate recovery path. Triggering an appropriate recovery path may include one or more of: shutting down the current execution, isolating an error prone path and/or state data, inducing a controlled exception to clean up resources, or isolating the error and activating a regeneration path.

Described herein are apparatus, systems, techniques and articles for predicting potential software faults or exceptions during real-time execution and suggesting a recovery path for avoiding the fault/exception. The disclosed apparatus, systems, techniques and articles can provide systems that utilize machine learning for exception forecasts based on critical software execution, paths and critical data parameters and range at nodal points in execution paths. The disclosed apparatus, systems, techniques and articles can provide systems that utilize smart error/exception handling. The disclosed apparatus, systems, techniques and articles can provide reset free products, which can increase customer satisfaction with zero or near-zero product downtime with a built in intelligent system for handling anomalies and providing more deterministic system behavior. The disclosed apparatus, systems, techniques and articles can improve product performance, MTBF (mean time between failure), and customer satisfaction, and can reduce costs for servicing field issues by eliminating the necessity of point software upgrades to fix software bugs. The disclosed apparatus, systems, techniques and articles can provide a smart model for robust detection of causal factors leading to an exception in a real time avionics system. The disclosed apparatus, systems, techniques and articles can provide a unique representation of causal factors as the path traversed and the dataset that lead to exceptions. The disclosed apparatus, systems, techniques and articles can provide a representation of the execution nodes (e.g., state of the nodes, dataset causing exception). The disclosed apparatus, systems, techniques and articles can provide systems for establishing the correlation between the causal factors and the type of exception. The disclosed apparatus, systems, techniques and articles can provide systems configured to learn from the correlation between the causal factors and the type of exception to provide foresight on exceptions and/or critical execution paths. The disclosed apparatus, systems, techniques and articles can suggest and switch to the best and most optimal possible recovery associated with the exception.

In one embodiment, a processor-implemented smart exception handler system for safety-critical real-time systems in an aircraft is provided. The exception handler system comprises one or more processors configured by programming instructions on non-transient computer readable media. The exception handler system is configured to: receive a plurality of parameters at a plurality of nodal points in a real-time execution path for a safety-critical aircraft system; analyze the received parameters using a trained exception handling model for the safety-critical aircraft system, wherein the trained exception handling model has been trained using machine learning techniques to learn the critical path of execution and/or critical range of parameters at critical nodes, wherein the critical range of parameters comprises a learned threshold at a node; compute, using the trained exception handling model, a probability of fault at the critical nodes; compare the probability of fault at a critical node against a learned threshold at the node; and take proactive action in real-time to avoid the occurrence of a fault when the probability of fault at the node is higher than the learned threshold at the node.

In one embodiment, the parameters at a nodal point include computed parameters at the nodal point and environmental parameters at the nodal point.

In one embodiment, the trained exception handling model was trained using regression-based learning.

In one embodiment, to take proactive action in real-time to avoid the occurrence of a fault the system is configured to visually annunciate to the flight crew that a safety-critical real-time system is likely to experience a fault if its critical path of execution is not altered.

In one embodiment, to take proactive action in real-time to avoid the occurrence of a fault the system is configured to adopt an alternate execution in a slightly degraded mode until the safety-critical aircraft system is fully operational.

In one embodiment, to take proactive action in real-time to avoid the occurrence of a fault the system is configured to trigger an appropriate recovery path.

In one embodiment, an appropriate recovery path comprises one or more of: shutting down the current execution; isolating an error prone path and/or state data; inducing a controlled exception to clean up resources; or isolating the error and activating a regeneration path.

In another embodiment, a processor-implemented method for handling exceptions with safety-critical real-time systems in an aircraft is provided. The method comprises: receiving a plurality of parameters at a plurality of nodal points in a real-time execution path for a safety-critical aircraft system; analyzing the received parameters using a trained exception handling model for the safety-critical aircraft system, wherein the trained exception handling model has been trained using machine learning techniques to learn the critical path of execution and/or critical range of parameters at critical nodes, wherein the critical range of parameters comprises a learned threshold at a node; computing, using the trained exception handling model, a probability of fault at the critical nodes; comparing the probability of fault at a critical node against a learned threshold at the node; and taking proactive action in real-time to avoid the occurrence of a fault when the probability of fault at the node is higher than the learned threshold at the node.

In one embodiment, the parameters at a nodal point include computed parameters at the nodal point and environmental parameters at the nodal point.

In one embodiment, the trained exception handling model was trained using regression-based learning.

In one embodiment, taking proactive action in real-time to avoid the occurrence of a fault the system comprises visually annunciating to the flight crew that a safety-critical real-time system is likely to experience a fault if its critical path of execution is not altered.

In one embodiment, taking proactive action in real-time to avoid the occurrence of a fault comprises adopting an alternate execution in a slightly degraded mode until the safety-critical aircraft system is fully operational.

In one embodiment, taking proactive action in real-time to avoid the occurrence of a fault comprises triggering an appropriate recovery path.

In one embodiment, triggering an appropriate recovery path comprises one or more of: shutting down the current execution; isolating an error prone path and/or state data; inducing a controlled exception to clean up resources; or isolating the error and activating a regeneration path.

In another embodiment, non-transient computer readable media encoded with programming instructions configurable to cause a processor on an aircraft to perform a method is provided. The method comprises: receiving a plurality of parameters at a plurality of nodal points in a real-time execution path for a safety-critical aircraft system; analyzing the received parameters using a trained exception handling model for the safety-critical aircraft system, wherein the trained exception handling model has been trained using machine learning techniques to learn the critical path of execution and/or critical range of parameters at critical nodes, wherein the critical range of parameters comprises a learned threshold at a node; computing, using the trained exception handling model, a probability of fault at the critical nodes; comparing the probability of fault at a critical node against a learned threshold at the node; and taking proactive action in real-time to avoid the occurrence of a fault when the probability of fault at the node is higher than the learned threshold at the node.

In one embodiment, the parameters at a nodal point include computed parameters at the nodal point and environmental parameters at the nodal point.

In one embodiment, the trained exception handling model was trained using regression-based learning.

In one embodiment, taking proactive action in real-time to avoid the occurrence of a fault the system comprises visually annunciating to the flight crew that a safety-critical real-time system is likely to experience a fault if its critical path of execution is not altered.

In one embodiment, taking proactive action in real-time to avoid the occurrence of a fault comprises adopting an alternate execution in a slightly degraded mode until the safety-critical aircraft system is fully operational.

In one embodiment, taking proactive action in real-time to avoid the occurrence of a fault comprises triggering an appropriate recovery path comprising one or more of: shutting down the current execution; isolating an error prone path and/or state data; inducing a controlled exception to clean up resources; or isolating the error and activating a regeneration path.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A processor-implemented smart exception handler system for a safety-critical real-time avionics system in an aircraft, the safety-critical real-time avionics system comprising the smart exception handler system, a user interface command generator, a command processor and an avionics function, the exception handler system comprising a controller configured to:
determine, for a command from the user interface command generator to the avionics function, whether the command is safe to execute, wherein to determine whether the command is safe to execute, the controller is further configured to:
receive a plurality of parameters comprising one or more computed software parameters for a unit of software and one or more environmental parameters at a software nodal point in a real-time execution path in the unit of software for the safety-critical avionics system;
analyze the received parameters using a trained exception handling model for the safety-critical avionics system, wherein the trained exception handling model has been trained using machine learning techniques to learn the probability value of a fault condition occurring in software based on historical computed software parameter values and environmental parameter values at a plurality of nodes and to learn a learned threshold value at the plurality of nodes;
compute, using the trained exception handling model, the one or more computed software parameters, and the one or more environmental parameters, a probability of fault at a critical node in the unit of software; and compare the probability of fault at the critical node in the unit of software against a learned threshold value at the critical node; and take proactive action in real-time to avoid the occurrence of a fault in the unit of software when the probability of fault at the critical node is higher than the learned threshold at the critical node.

2. The system of claim 1, wherein the trained exception handling model was trained using regression-based learning.

3. The system of claim 1, wherein to take proactive action in real-time to avoid the occurrence of a fault the system is configured to visually annunciate to the flight crew that a safety-critical real-time system is likely to experience a fault if its critical path of execution is not altered.

4. The system of claim 1, wherein to take proactive action in real-time to avoid the occurrence of a fault the system is configured to adopt an alternate execution in a slightly degraded mode until the safety-critical aircraft system is fully operational.

5. The system of claim 1, wherein to take proactive action in real-time to avoid the occurrence of a fault the system is configured to trigger an appropriate recovery path.

6. The system of claim 5, wherein an appropriate recovery path comprises one or more of:
shutting down the current execution;
isolating an error prone path and/or state data;
inducing a controlled exception to clean up resources; or
isolating the error and activating a regeneration path.

7. A processor-implemented method for handling exceptions with safety-critical real-time avionics systems in an aircraft comprising the smart exception handler system, a user interface command generator, a command processor and an avionics function, the method comprising:
determining, for a command from the user interface command generator to the avionics function, whether the command is safe to execute, the determining comprising:
receiving a plurality of parameters comprising one or more computed software parameters for a unit of software and one or more environmental parameters at a software nodal point in a real-time execution path in the unit of software for the safety-critical avionics system;
analyzing the received parameters using a trained exception handling model for the safety-critical avionics system, wherein the trained exception handling model has been trained using machine learning techniques to learn the probability value of a fault condition occurring in software based on historical computed software parameter values and environmental parameter values at a plurality of nodes and to learn a learned threshold value at the plurality of nodes;
computing, using the trained exception handling model, the one or more computed software parameters, and the one or more environmental parameters, a probability of fault at a critical node in the unit of software; and
comparing the probability of fault at the critical node in the unit of software against a learned threshold value at the critical node; and
taking proactive action in real-time to avoid the occurrence of a fault in the unit of software when the probability of fault at the critical node is higher than the learned threshold at the critical node.

8. The method of claim 7, wherein the trained exception handling model was trained using regression-based learning.

9. The method of claim 7, wherein taking proactive action in real-time to avoid the occurrence of a fault comprises visually annunciating to the flight crew that a safety-critical real-time system is likely to experience a fault if its critical path of execution is not altered.

10. The method of claim 7, wherein taking proactive action in real-time to avoid the occurrence of a fault comprises adopting an alternate execution in a slightly degraded mode until the safety-critical aircraft system is fully operational.

11. The method of claim 7, wherein taking proactive action in real-time to avoid the occurrence of a fault comprises triggering an appropriate recovery path.

12. The method of claim 11, wherein triggering an appropriate recovery path comprises one or more of:
shutting down the current execution;
isolating an error prone path and/or state data;
inducing a controlled exception to clean up resources; or
isolating the error and activating a regeneration path.

13. Non-transitory computer readable media encoded with programming instructions configurable to cause a processor on an aircraft to perform a method for handling exceptions with a safety-critical real-time avionics system comprising a user interface command generator, a command processor and an avionics function, the method comprising:
determining, for a command from the user interface command generator to the avionics function, whether the command is safe to execute, the determining comprising:
receiving a plurality of parameters comprising one or more computed software parameters for a unit of software and one or more environmental parameters at a software nodal point in a real-time execution path in the unit of software for the safety-critical avionics system;
analyzing the received parameters using a trained exception handling model for the safety-critical avionics system, wherein the trained exception handling model has been trained using machine learning techniques to learn the probability value of a fault condition occurring in software based on historical computed software parameter values and environmental parameter values at a plurality of nodes and to learn a learned threshold value at the plurality of nodes;
computing, using the trained exception handling model, the one or more computed software parameters, and the one or more environmental parameters, a probability of fault at a critical node in the unit of software; and
comparing the probability of fault at the critical node in the unit of software against a learned threshold value at the critical node; and
taking proactive action in real-time to avoid the occurrence of a fault in the unit of software when the probability of fault at the critical node is higher than the learned threshold at the critical node.

14. The non-transitory computer readable media of claim 13, wherein the trained exception handling model was trained using regression-based learning.

15. The non-transitory computer readable media of claim 13, wherein taking proactive action in real-time to avoid the occurrence of a fault comprises visually annunciating to the flight crew that a safety-critical real-time system is likely to experience a fault if its critical path of execution is not altered.

16. The non-transitory computer readable media of claim 13, wherein taking proactive action in real-time to avoid the occurrence of a fault comprises adopting an alternate execution in a slightly degraded mode until the safety-critical aircraft system is fully operational.

17. The non-transitory computer readable media of claim 13, wherein taking proactive action in real-time to avoid the occurrence of a fault comprises triggering an appropriate recovery path.

18. The non-transitory computer readable media of claim 17, wherein the appropriate recovery path comprises one or more of:
  shutting down the current execution;
  isolating an error prone path and/or state data;
  inducing a controlled exception to clean up resources; or
  isolating the error and activating a regeneration path.

* * * * *